US008296729B2

(12) United States Patent
Ficatier et al.

(10) Patent No.: US 8,296,729 B2
(45) Date of Patent: Oct. 23, 2012

(54) PLUG-IN FOR ADAPTING AN INTEGRATED DEVELOPMENT ENVIRONMENT TO A PROGRAMMING LANGUAGE

(75) Inventors: Olivier Ficatier, Nice (FR); Vincent Figari, Montauroux (FR)

(73) Assignee: SAP AG, Walldorf (DE)

( * ) Notice: Subject to any disclaimer, the term of this patent is extended or adjusted under 35 U.S.C. 154(b) by 1121 days.

(21) Appl. No.: 11/281,240

(22) Filed: Nov. 17, 2005

(65) Prior Publication Data
US 2006/0184925 A1      Aug. 17, 2006

(30) Foreign Application Priority Data
Feb. 15, 2005   (EP) ..................................... 05290338

(51) Int. Cl.
*G06F 9/44*        (2006.01)

(52) U.S. Cl. ......... 717/114; 717/104; 717/111; 717/117

(58) Field of Classification Search .................. None
See application file for complete search history.

(56) References Cited

U.S. PATENT DOCUMENTS

| 6,564,213 | B1  |    | 5/2003  | Ortega et al. |            |
|-----------|-----|----|---------|---------------|------------|
| 8,069,437 | B2  | *  | 11/2011 | Aigner et al. | ... 717/109 |
| 2004/0187140 | A1 | * | 9/2004  | Aigner et al. | ... 719/328 |
| 2006/0075120 | A1 | * | 4/2006  | Smit          | ... 709/227 |
| 2006/0095439 | A1 | * | 5/2006  | Buchmann et al.| ... 707/100 |

OTHER PUBLICATIONS

Curran, T., "Technical review: SAP's ABAP/4 Development Workbench", OPB Publishing, Bristol, BG, 6 pgs., Dec. 1994.
URL: http://ourworld.compuserve.com/homepages/aborka/ "SAPEdit External ABAP Editor", Feb. 19, 2002, 5 pgs.

* cited by examiner

*Primary Examiner* — Chuck Kendall
(74) *Attorney, Agent, or Firm* — Schwegman Lundberg Woessner, P.A.

(57) ABSTRACT

A system features a back-end computing system that includes a library that contains objects for use with a computer programming language, and a front-end computing system that executes a development environment. The development environment includes a plug-in that supports the computer programming language, and the plug-in enables access to the library. The plug-in includes a first component to perform syntax checking for the computer programming language in the integrated development environment, and a second component to provide access to the library from the integrated development environment.

17 Claims, 3 Drawing Sheets

PLUG-IN FOR ADAPTING AN INTEGRATED DEVELOPMENT ENVIRONMENT TO A PROGRAMMING LANGUAGE

TECHNICAL FIELD

This patent application relates generally to a plug-in for adapting an integrated development environment to a programming language.

BACKGROUND

An integrated development environment (IDE) is computer software that enables computer programmers to develop other software. An IDE typically includes a source code editor, a compiler, an interpreter, build-automation tools, and a debugger. IDE's that are used for developing object-oriented software may also include a class browser, an object inspector, and a class hierarchy diagram. One example of an IDE that may be used to develop object-oriented software is Eclipse. Generally, Eclipse provides various tools and user interfaces (UIs), which are considered to be relatively user-friendly.

A business application may be used to track information that relates to a business by obtaining and integrating finance, sales, and materials data. Specialized programming languages have been developed for writing business applications. One example of such a programming language is the advanced business application programming (ABAP) language. ABAP includes a workbench that offers tools for use in developing business applications. In more detail, the ABAP workbench supports the development and modification of client/server applications written in ABAP, and includes tools that can be used to write ABAP code, design screens, and create U's.

In some cases, ABAP developers may prefer development tools that are available in Eclipse (or other IDEs) over the tools provided by the ABAP workbench. Heretofore, however, Eclipse tools were not available to ABAP developers.

SUMMARY

In general, in one aspect, the invention features a system that includes a back-end computing system having a library that contains objects for use with a computer programming language, and a front-end computing system that executes a development environment. The development environment includes a plug-in that supports the computer programming language, and the plug-in enables access to the library. By providing the plug-in, and the plug-in enabling access to the library, the invention allows the computer programming language to be used in the development environment. This is particularly advantageous in cases where editing tools available through the development environment are not already available in the computer programming language. This aspect of the invention may also include one or more of the following.

The plug-in may perform syntax checking and/or autocompletion for the computer programming language in the development environment. The back-end computing system may be a repository, and the repository may store the library. The objects may be business objects for use with the computer programming language. The development environment may be Eclipse and the computer programming language may be ABAP. The plug-in may enable the front-end system to store an object in the library and to retrieve an object from the library. The development environment may include at least one tool that assists a developer to program in the programming language. The plug-in may be configurable to permit the front-end computing system to operate in a stand-alone mode in which access to the library is prevented.

In general, in another aspect, the invention features a computer program product tangibly embodied in an information carrier for adapting an integrated development environment to a programming language. The computer program product includes instructions to implement a first component to perform syntax checking for the computer programming language in the integrated development environment, and instructions to implement a second component to provide access to a library of objects from the integrated development environment. This aspect may also include one or more of the following.

The first component may perform autocompletion for the computer programming language. In this context, autocompletion includes providing a pop-up window to assist in development in the programming language. The integrated development environment may be Eclipse, and the computer programming language may be ABAP. The library of objects may be stored in a repository that is separate from a device on which the integrated development environment is executed. The objects may be business objects for use with the computer programming language. The integrated development environment may be a first workbench that replaces a second workbench associated with the computer programming language. The first workbench may include tools for use in developing an application using the computer programming language. The first workbench may be an Eclipse workbench and the second workbench may be an ABAP workbench.

In general, in another aspect, the invention is a system that features a back-end computing system that includes a library that contains objects for use with a computer programming language, and a front-end computing system that executes a development environment. The development environment includes a plug-in that supports the computer programming language, and the plug-in enables access to the library. The plug-in includes a first component to perform syntax checking for the computer programming language in the integrated development environment, and a second component to provide access to the library from the integrated development environment.

The foregoing aspect may include one or more of the following. The first component may perform autocompletion for the computer programming language. In this context, autocompletion includes providing a pop-up window to assist in development in the programming language. The integrated development environment may be Eclipse, and the computer programming language may be ABAP.

The details of one or more examples are set forth in the accompanying drawings and the description below. Further features, aspects, and advantages of the invention will become apparent from the description, the drawings, and the claims.

DESCRIPTION OF THE DRAWINGS

FIG. 3 is a screen shot showing features available in Eclipse.

Like reference numerals in different figures indicate like elements.

DETAILED DESCRIPTION

Figure 1:
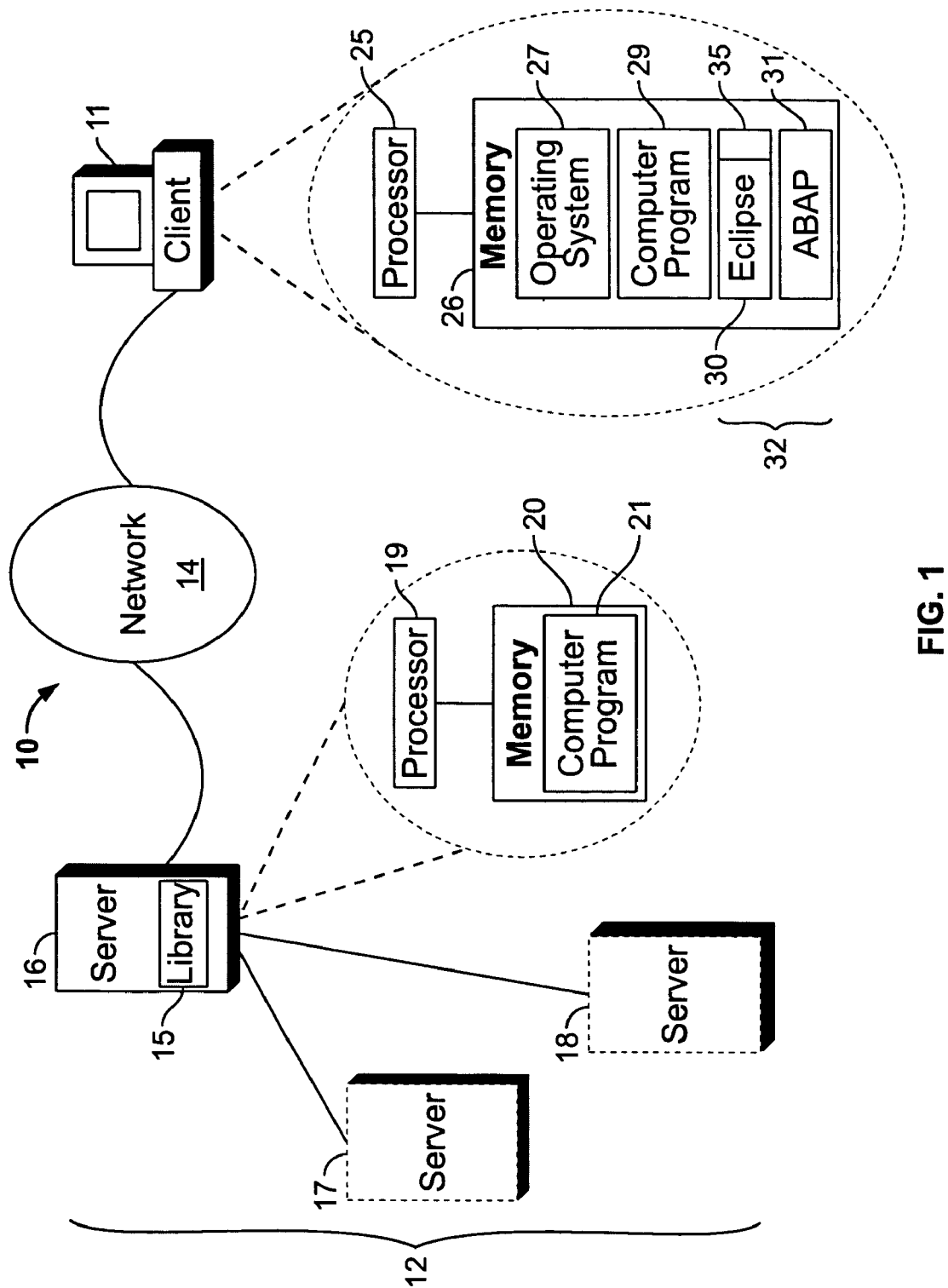
FIG. 1 is a block diagram of elements of an exemplary computer network.

FIG. 1 shows an example of a computer system 10 on which the development environment described herein may be implemented. Computer system 10 includes a front-end component (client 11) and a back-end component 12. A network 14 allows client 11 and back-end component 12 to communicate and to exchange data.

Eclipse is an IDE, as noted above, and provides an extensible platform for programmers. Eclipse provides a core of services for controlling a set of tools that work together to support programming tasks. Tool builders contribute to the Eclipse platform by wrapping their tools in pluggable components, called Eclipse plug-ins, which conform to Eclipse's plug-in standard. An Eclipse plug-in is a component that provides a type of service. In this context, a "component" is an object that may be configured into a system at system deployment time. The Eclipse runtime environment provides an infrastructure to support the activation and operation of a set of plug-ins working together to provide a relatively seamless environment to support programming activities. One mechanism of extensibility in Eclipse is that new plug-ins can add new processing elements to existing plug-ins. Eclipse also provides a set of core plug-ins to support this functionality.

As noted above, ABAP is a programming language for use in developing business applications. Back-end component 12 (or an associated repository) stores an ABAP dictionary in library 15. The ABAP dictionary contains data describing the logical structure of application development objects and their representations. ABAP runtime environment components, such as application programs or a database interface, obtain information about these objects from the ABAP dictionary. Computer programs 32 on client 11 makes use of information from the ABAP dictionary during application development. These include an Eclipse program 30 for running the Eclipse environment on client 11, and an ABAP program 31 for supporting ABAP programming on client 11.

In ABAP, there are different types of data, such as integer, character field, structure or internal table. The ABAP workbench contains a toolset that enables developers to customize and extend existing applications or created new applications. ABAP is keyword-oriented, meaning that a keyword is the first word in an ABAP statement, and determines the meaning of the entire statement. For example, there are four different types of ABAP keywords: declarative keywords, event keywords, control keywords, and operational keywords. Each of these precedes a corresponding statement.

An Eclipse plug-in 35 (referred to as the "ABAP plug-in") is provided on client 11 to enable ABAP developers to program in an Eclipse environment and thereby to take advantage of tools provided in the Eclipse workbench. In this embodiment, ABAP plug-in 35 contains two components. The first component is programmed with ABAP's keywords and syntax, thereby enabling Eclipse to recognize ABAP keywords and to perform syntax checking for ABAP programs developed in the Eclipse environment. What is meant by syntax checking, in this context, is to confirm that code written in ABAP conforms to its rules and requirements, i.e., to its syntax. The first component of the ABAP plug-in also enables autocompletion for ABAP in the Eclipse environment. Autocompletion is a feature that provides one or more pop-up windows listing possible completions for "initiating" strings that a user has typed. An initiating string may be a programming-language keyword or identifier, such as an ABAP keyword, or a similar entity.

The second component of the ABAP plug-in provides an interface to back-end component 12. More specifically, this component of the ABAP plug-in communicates to obtain access to ABAP objects in the ABAP library, and to export programs and/or objects to library 15. This component of the ABAP plug-in may be deactivated temporarily, thereby enabling a programmer to work in the Eclipse environment in a stand-alone mode.

Figure 3:
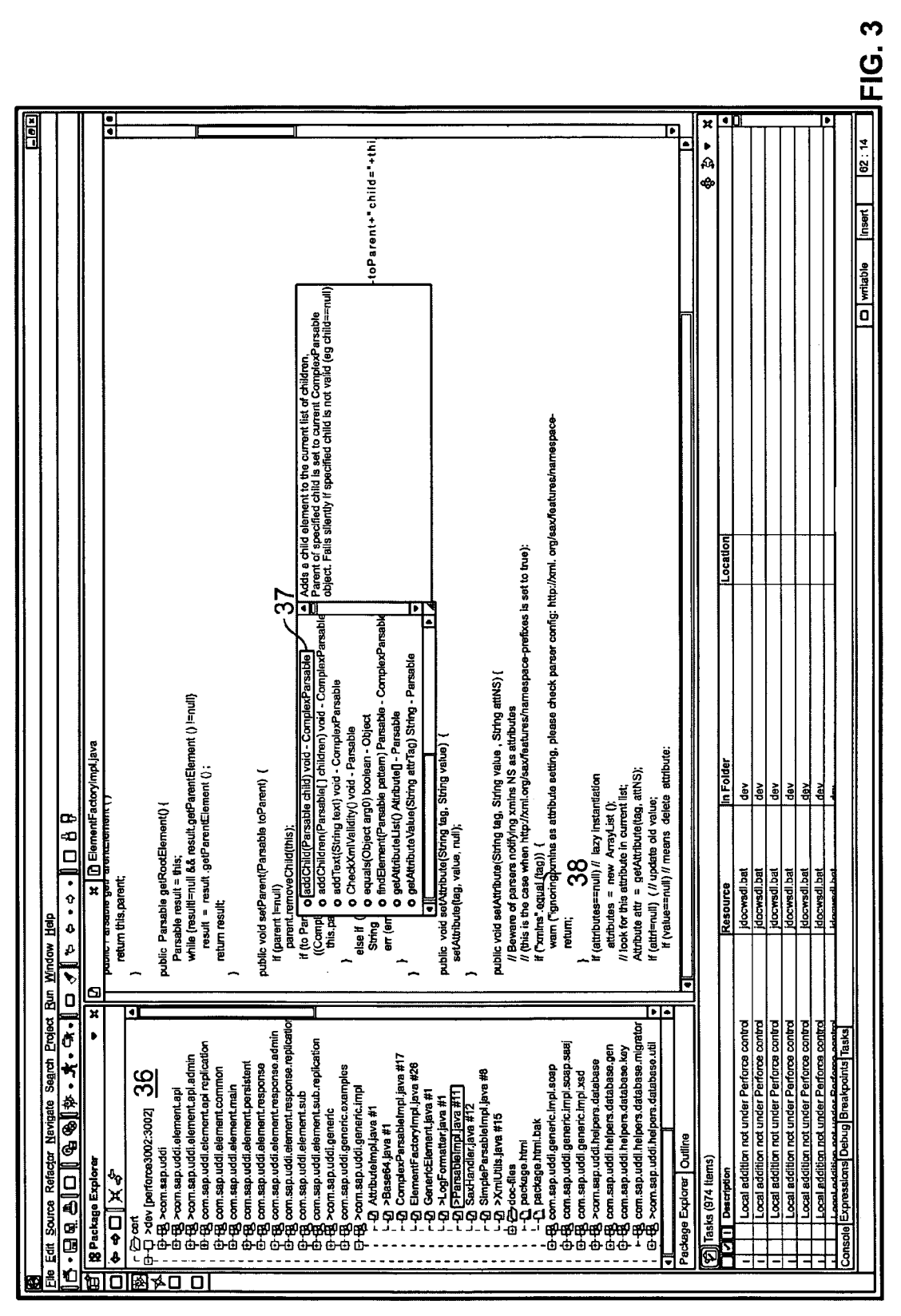

Using the first component, a programmer can program in the Eclipse environment and, using the second component, the programmer can reference objects in the ABAP library without requiring that the objects be loaded into the Eclipse environment. Thus, the programmer can take advantage of the relatively more user-friendly tools in the Eclipse workbench when developing computer programs in ABAP. For example, as shown in FIG. 3, Eclipse offers a single-screen view of multiple files (by virtue of tree structure 36), syntax coloring and/or highlighting of keywords, pop-up choices 37 for auto-completion of function calls, and immediate highlighting 38 of syntax errors (e.g., "equal" is underlined in red and cross marked in the margin). By contrast, a standard ABAP editor provides a single-screen view of a single object, limited coloring and highlighting effects, and identification of syntax errors only when requested.

Figure 2:
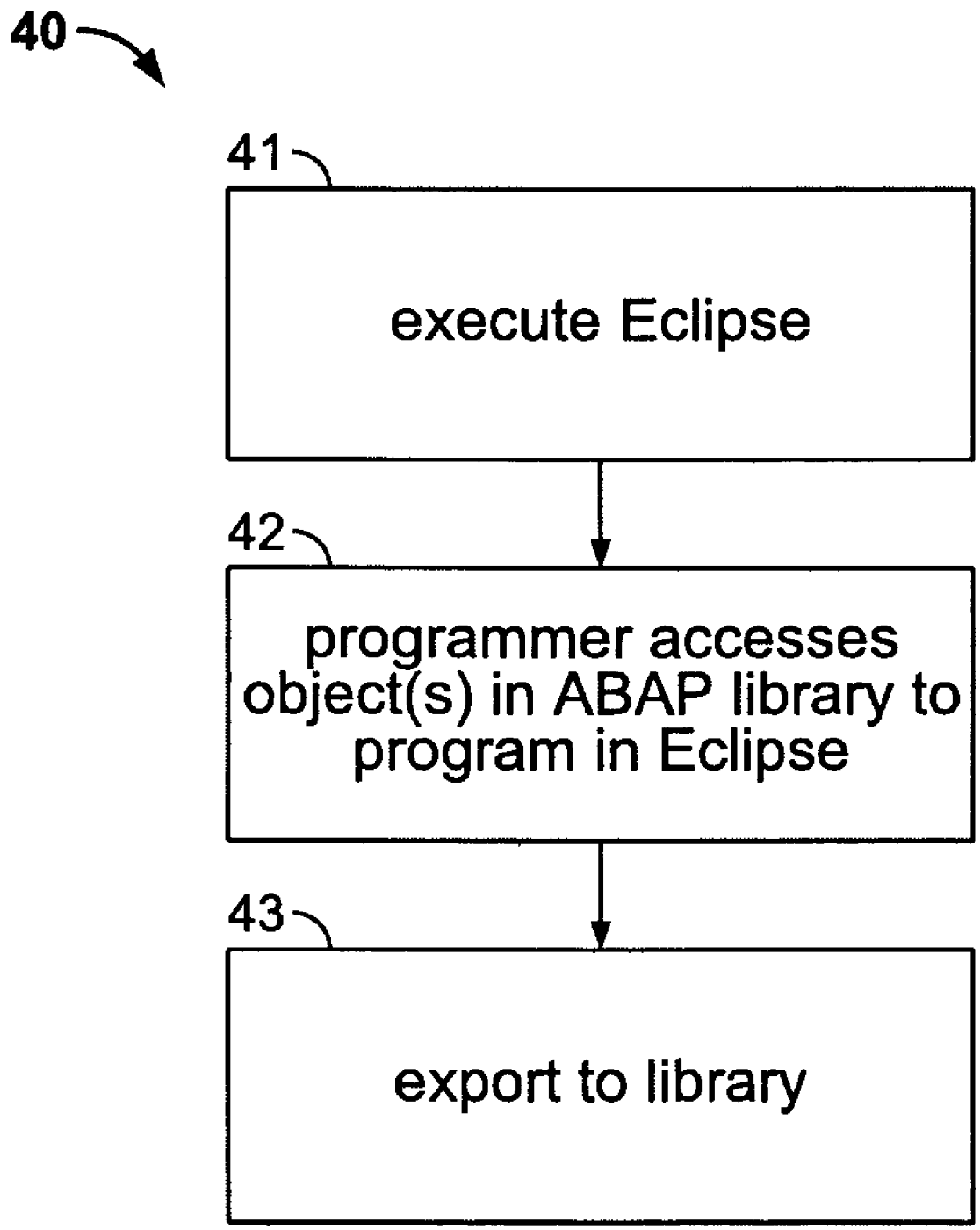
FIG. 2 is a flowchart showing a process for programming in ABAP in an Eclipse integrated development environment.

FIG. 2 shows a process 40 that is implemented by a programmer to program in ABAP in an Eclipse environment. According to process 40, a programmer executes (41) software to generate the Eclipse environment. The ABAP plug-in, running in association with Eclipse, allows the programmer to access (42), e.g., reference, objects in the ABAP library via back-end component 12 when programming. When the programmer is finished, or during development, the programmer can export (43) programs and/or new objects to the library via the ABAP plug-in and the back-end computer system.

As shown in FIG. 1, back-end component 12 may include one or more devices, which store, and/or provide access to, library 15, which includes the business objects and other ABAP-related information. Back-end component 12 may include one server 16 or multiple servers 16 to 18 (servers 17 and 18 are depicted using dashed lines to indicate that they are optional). In the case of multiple servers, server 16 may act as a controller or "load balancer" for the remaining servers 17 and 18. In this role, server 16 may route data, requests, and instructions between an "external device" (e.g., client 11) and a "slave" server, such as server 17. Each server may have the same structure; therefore, only server 16 is described. In one embodiment, back-end component 12 may include an R/3 system, which is provided by SAP® AG of Walldorf, Germany.

Server 16 may be any type of computing device that is capable of receiving and storing data, and of communicating with client 11. As shown in FIG. 1, server 16 includes one or more processors (referred to simply as "processor 19") and memory 20 that stores computer programs that are executable by processor 19. The computer programs include a computer program 21 for accessing library 15, e.g., for retrieving an object from the library and for sending an object to the library.

Library 15 may be stored in back-end component 12 or in a separate repository that is accessible to back-end component 12 over a bus or over a network connection.

Client 11 may be any type of computing device, such as a desktop computer, a mainframe computer, or the like, that can be used to run an Eclipse environment, and that is capable of obtaining business objects and of transmitting those business objects to server 12. Network 20 may include a high-speed data link, such as Ethernet, that connects client 11 to back-end component 12. The connection may be wired or wireless.

As shown in FIG. 1, client 11 includes one or more processors (referred to simply as "processor 25") and memory 26 that stores computer programs that are executable by processor 25. Memory 26 stores an operating system 27, a computer program 29 that enables communication between client 11 and back-end component 12, and computer program(s) that support use of Eclipse 30 and ABAP 31 on client 11.

The ABAP plug-in and process 40 are not limited to use with the hardware and software described above; they may find applicability in any computing or processing environment and with any type of machine that is capable of running machine-readable instructions. All or part of the ABAP plug-in and process 40 can be implemented in digital electronic circuitry, or in computer hardware, firmware, software, or in combinations thereof.

All or part of the ABAP plug-in and process 40 can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps associated with the ABAP plug-in and process 40 can be performed by one or more programmable processors executing one or more computer programs to perform the functions of process 40. The method steps can also be performed by, and process 40 can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include a processor for executing instructions and one or more storage area devices for storing instructions and data. Generally, a computer will also include, or be operatively coupled to receive data from, or transfer data to, or both, one or more mass storage devices for storing data, e.g., magnetic, magneto-optical disks, or optical disks. Information carriers suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

All or part of the ABAP plug-in and process 40 can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of process 40, or any combination of such back-end, middleware, or front-end components. The components of the system can be interconnected by any form or medium of digital data communication, e.g., a communication network. Examples of communication networks include a LAN and a WAN, e.g., the Internet.

Method steps associated with process 40 can be rearranged and/or one or more such steps can be omitted to achieve the same, or similar, results to those described herein.

Elements of different embodiments described herein may be combined to form other embodiments not specifically set forth above. Other embodiments not specifically described herein are also within the scope of the following claims.

What is claimed is:

1. A system comprising:
    a back-end computing system comprising a library that contains objects for use with an advanced business application programming (ABAP) language; and
    a front-end computing system that executes, using a processor, an Eclipse development environment, the Eclipse development environment comprising a plug-in, the plug-in enabling the Eclipse development environment to recognize the ABAP language and to access the library.

2. The system of claim 1, wherein the plug-in performs syntax checking for the ABAP language in the Eclipse development environment.

3. The system of claim 1, wherein the plug-in performs autocompletion for the ABAP language in the Eclipse development environment.

4. The system of claim 1, wherein the back-end computing system comprises a repository, the repository storing the library.

5. The system of claim 1, wherein the objects comprise business objects for use with the ABAP language.

6. The system of claim 1, wherein the plug-in enables the front-end computing system to store an object in the library and to retrieve an object from the library.

7. The system of claim 1, wherein the Eclipse development environment comprises at least one tool that assists a developer to program in the ABAP language.

8. The system of claim 1, wherein the plug-in is configurable to permit the front-end computing system to operate in a stand-alone mode in which access to the library is prevented.

9. A computer program product tangibly embodied in a non-transitory machine-readable storage device for adapting an Eclipse development environment to an advanced business application programming (ABAP) language, the computer program product comprising instructions to implement:
    a first component to enable the Eclipse development environment to recognize the ABAP language and perform syntax checking for the ABAP language in the Eclipse development environment; and
    a second component to provide access to a library of objects from the Eclipse development environment.

10. The computer program product of claim 9, wherein the first component performs autocompletion for the ABAP language, wherein autocompletion comprises providing a pop-up window to assist in development in the ABAP language.

11. The computer program product of claim 9, wherein the library of objects is stored in a repository that is separate from a device on which the Eclipse development environment is executed.

12. The computer program product of claim 9, wherein the objects comprise business objects for use with the ABAP language.

13. The computer program product of claim 9, wherein the Eclipse development environment comprises a first workbench that replaces a second workbench associated with the ABAP language.

14. The computer program product of claim 13, wherein the first workbench comprises tools for use in developing an application using the ABAP language.

15. The computer program product of claim 13, wherein the first workbench comprises an Eclipse workbench and the second workbench comprises an ABAP workbench.

16. A system comprising:
a back-end computing system comprising a library that contains objects for use with an ABAP language; and
a front-end computing system that executes, using a processor, an Eclipse development environment, the Eclipse development environment comprising a plug-in that supports the ABAP language, the plug-in enabling access to the library;
wherein the plug-in comprises:
a first component to enable the Eclipse development environment to recognize the ABAP language and perform syntax checking for the ABAP language in the Eclipse development environment; and
a second component to provide access to the library from the Eclipse development environment.

17. The system of claim 16, wherein the first component performs autocompletion for the ABAP language, wherein autocompletion comprises providing a pop-up window to assist in development in the ABAP language.

* * * * *